United States Patent [19]

Lugo

[11] Patent Number: 4,925,204
[45] Date of Patent: May 15, 1990

[54] BICYCLE FORK PROTECTOR AND WHEEL REFLECTOR APPARATUS

[76] Inventor: George J. Lugo, 3215 E. Towner, Tucson, Ariz. 85716

[21] Appl. No.: 302,811

[22] Filed: Jan. 27, 1989

[51] Int. Cl.[5] .......................... B62H 3/00; B62J 23/00
[52] U.S. Cl. ................................... 280/295; 280/293; 280/304.3; 350/99
[58] Field of Search ............... 280/276, 279, 293, 295, 280/296, 297, 288.4, 304.3; 350/97, 99, 98, 107

[56] References Cited

U.S. PATENT DOCUMENTS 3,979,113  9/1976  Uhl et al. ...................... 280/288.4 X
4,201,448  5/1980  Kagayama ............................ 350/99
4,563,016  1/1986  Holleron, Jr. ...................... 280/293

FOREIGN PATENT DOCUMENTS 360993   5/1906  France ................................ 280/293
610103   8/1926  France ................................ 280/293
363157   9/1938  Italy .................................... 280/293
13573    of 1897 United Kingdom ................ 280/293

Primary Examiner—David M. Mitchell
Assistant Examiner—Brian L. Johnson
Attorney, Agent, or Firm—J. Michael McClanahan

[57] ABSTRACT

It is common for bicycle riders to remove the bicycle front wheel and secure it with a lock and chain to the bicycle back wheel and frame when parking a bicycle. In such a case, the front fork of the bicycle then engages the ground. This often causes damage to the front fork or to the drop out slots in the front fork. To this end, a bicycle fork protector has been devised, the fork protector secured in the drop out slots of the blades of the front fork, the fork protector adapted to be interposed between the front fork and the ground. The fork protector consists of a generally elongated flat plate made of durable material with two pairs of opposite sides, one elongated side being a rounded side, the rounded side having a dense shock absorbing material strip adhesively attached thereto adapted to engage the ground. The opposite straight side is wedged into and frictionally held by the drop out slots of the bicycle front fork. In alternate embodiments, structure is provided to secure the fork protector to the bicycle front fork and to selectively place reflective material on the protector and be held to a spoke in order that the protector may double as a safety reflector for a bicycle wheel.

10 Claims, 1 Drawing Sheet

BICYCLE FORK PROTECTOR AND WHEEL REFLECTOR APPARATUS

BACKGROUND OF THE INVENTION

1. FIELD OF THE INVENTION

The field of the invention is devices adapted to protect a bicycle front fork from damage when the front fork engages the ground while parked where the front wheel has been removed to secure it with the back wheel and bicycle frame.

2. DESCRIPTION OF THE RELATED ART

In an effort to stem bicycle thefts, bicycle manufacturers have for some time made it possible to readily remove the front wheel of the bicycle by means of quick-release nuts on either side of the front wheel axle. Utilizing the quick-release nuts, the bicycle front wheel may be removed from the front fork by loosening the quick-release nuts that secure the front wheel axle in the drop out slots formed in the extended tip of each blade of the front fork. The front wheel is then removed to the vicinity of the bicycle rear wheel where the bicycle rear wheel, front wheel, and frame are secured to a upright standard, post, or other secure monument by means of an elongated chain and lock. In the past, because of the distance between the front wheel and the back wheel, the chain required to loop the frame, front wheel, and the back wheel around a post or other secure standard would be excessively long and heavy. By the present means of placing both wheels close together, a chain of substantially shorter length may be utilized.

If the shortened length of chain and lock are utilized to secure a bicycle back wheel and frame, but the front wheel is not removed and placed with the back, then thieves may steal the front wheel, leaving the remainder of the bicycle. If the bicycle front wheel and frame are locked to a standard, the thieves then remove the back wheel, leaving only the front wheel and frame secured. Thus it is apparent why bicycle manufacturers began to adopt the quick-release front wheel.

As is the situation when many new inventions come on the market solving the major problem, such as theft, additional minor problems are then created. The minor problem created by the quick-release front wheel is that when the front wheel is removed from the bicycle, the ends or tips of the bicycle front fork blades then rests upon the ground or concrete or where ever the bicycle is parked. If, in the process of removing the front wheel the bicycle is dropped after the wheel is removed, opportunities are presented for damaging the tips of the front fork blades by bending or breaking the metal of the front fork on either side of the drop out slots at the tips of the blades. In addition, if somebody stands or sits on the bicycle frame while the front fork tips engage the ground, there is still even more opportunity to damage the tips and the drop out slots. This is especially so since the normal position of the parked bicycle is vertically up where the blade tips engage the ground at a perpendicular angle.

It is apparent that it would be useful to provide a mechanism which is secured to the bicycle front fork and interposed the tips and the ground in order that damage to the tips and to the drop out slots may be avoided.

Accordingly, there is an advantage of providing a mechanism which is secured by the bicycle front fork drop out slots and which serves to hold the frame tips in a fixed spaced position to prevent the frame tips from engaging the ground, and, additionally, to help place the frame tips from being bent closer to each other, or further apart, and prevent side to side skew distortion.

SUMMARY OF THE INVENTION

This invention relates to a novel bicycle fork protector which engages the drop out slots of the blades of the front fork tips, and is frictionally held in place to present a barrier to the front fork tips from touching the ground after the front wheel has been removed from the bicycle. In addition, the invention maintains the fork tips in a spaced apart relationship and prevents side to side skew distortion.

In this respect, the bicycle fork protector comprises a somewhat elongated flat plate shaped solid high impact material structure, having two pairs of opposite sides, one of the elongated sides being relatively straight and adapted to be placed interiorly to the bicycle front fork drop out slots. The opposite elongate side is rounded or arcuate in shape and it is this portion of the invention which engages the ground. The rounded side edge allows the bicycle to rock from side to side if perturbed during its period of parking without the fork protector coming out of one or the other drop out slots. The other pair of opposite sides are rather short and merely connect the two elongated sides. The fork protector takes on an appearance, in viewing one of the flat sides, of a somewhat truncated triangle with a bottom rounded edge. In addition, to this bottom rounded edge is adhesively attached a dense shock absorbing material strip, such as rubber or plastic, which is actually the part of the device which contacts the hard surface such as the concrete, asphalt, or ground.

The bicycle fork protector is of a thickness, generally about ¼ inch, such that it rests securely within the bicycle front fork drop out slots and requires some little effort to place the device in the drop out slots in order that it is frictionally held there. The protector is preferable constructed of a solid, hard, high impact material such as dense plastic or rubber.

Further, alternate embodiments provide means to secure the bicycle fork protector to the bicycle front fork blades when not in use by installing VELCRO (synthetic materials which adhere when pressed together) fastening material on the outside of one blade of the front fork and the complimentary VELCRO fastening material on the fork protector whereupon the two VELCRO material are brought together. In order to assure that the device will not be lost, stolen, or removed, a small diameter plastic coated steel cable is attached at one end to the bicycle fork and at the other end to the fork protector.

Still another embodiment of the subject device is to use the device as a safety reflector by coating both flat surfaces the fork protector with a reflective material or by attaching a plastic reflector to each of the flat surfaces and then, through the use of a push button attached to a spoke hook, the device is hooked to one the front wheel spokes while also wedged between the spokes on either side.

Still further, notches are formed in one side to surround the front fork drop out slots to further secure the front fork against side to side deformation.

It is an object of the subject invention to provide means offering protection to a bicycle front fork blade tips against damage when the front wheel of the bicycle has been removed and the front fork tips would otherwise rest pointed into the ground.

It is another object of the subject invention to provide a bicycle fork protector which protects the bicycle front fork against sudden shocks when the front wheel is removed and the front fork dropped.

It is still another object of the subject invention to provide a front fork protector having its own means to secure the protector to the fork during times when it is not being used.

It is still another object of the subject invention to provide a bicycle fork protector which doubles as a safety reflector usable upon the bicycle when the fork protector is not itself being actively used protecting the fork.

Other objects of the invention will in part be obvious and will in part appear hereinafter. The invention accordingly comprises the apparatus and method comprising construction, combination of elements, and arrangement of parts which are exemplified in following detailed disclosure, and the scope of the application which will be indicated in the claims.

BRIEF DESCRIPTION OF THE DRAWINGS

For further understanding of the nature and objects of the present invention, reference should be had to the following detailed description taken in connection with the accompanying drawings wherein.

In various views like index numbers refer to like elements.

DETAILED DESCRIPTION OF THE PREFERRED EMBODIMENT

Figure 1:
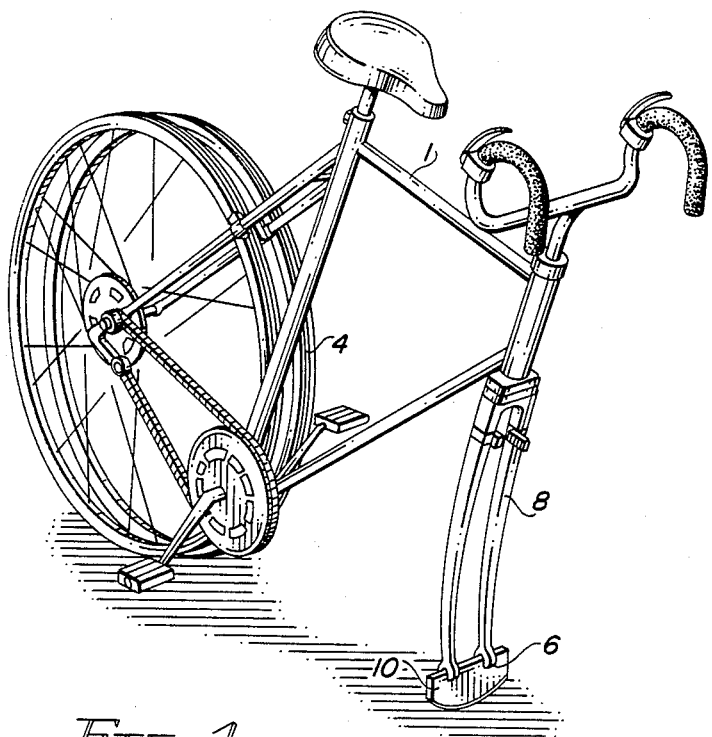
FIG. 1 is a front view of a bicycle with the subject invention installed in the front fork drop out slots.
Figure 3:
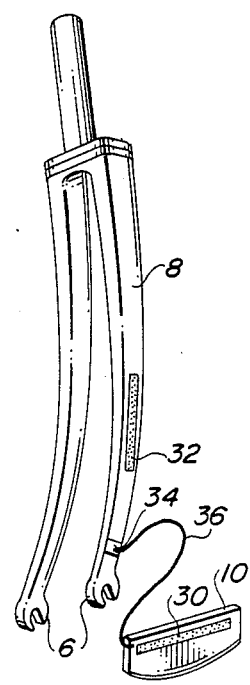
FIG. 3 is a side view of the bicycle front fork and an alternate embodiment of the invention.

Referring now to FIG. 1, a side view of a bicycle employing the invention is shown. In FIG. 1, the front fork of the bicycle has been turned slightly in order to more clearly show inventive bicycle fork protector 10. Bicycle fork protector 10 is frictional secured in the bicycle front fork drop out slots 6. By installation of the fork protector in the drop out slots, when front wheel 4 is removed and locked up with the rear wheel and the bicycle frame, damage to the front wheel fork is avoided as the front wheel fork contacts and rests upon the ground. In addition, the bottom of the fork protector is rounded so that if the bicycle is tipped, the tendency is for the fork protector to remain in both drop out slots and not pivot out of one or other of the slots.

Figure 2:
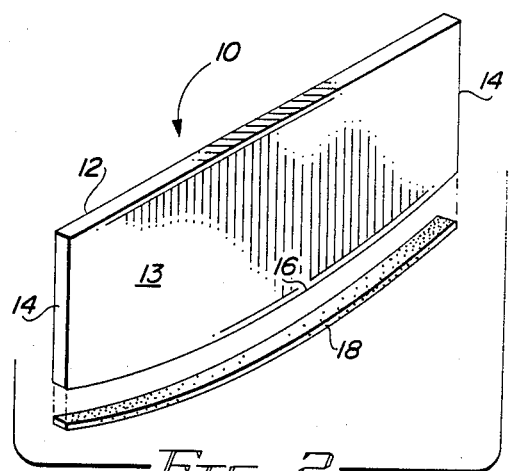
FIG. 2 is a perspective view of the subject invention.

FIG. 2 is a perspective view of bicycle fork protector 10 showing it to be a plate with two opposite, spaced apart flat surfaces separated by a thickness and four peripheral encompassing sides, the four sides being edges to the two flat surfaces, three sides being straight with the fourth side being rounded. The top edge 12 of fork protector 10 is flat and straight and is adapted to be urged into the front fork drop out slots 6 illustrated in FIG. 1. Ends 14 are nominally at right angles to edge 12 (although they need not be) and intersect with arcuate or rounded bottom edge 16, which is opposite flat straight top edge 12. In the preferred embodiment, fork protector 10 is constructed of a hard and durable material, such as a high quality dense plastic, and generally takes on dimensions of about 5 inches wide, 1½ inch wide (at its greatest point), and about ¼ inch thick. To reduce opportunities for potential chipping of the fork protector and to act as a shock absorber, a dense shock absorbing material strip 18, such as a rubber or plastic, has been attached by an adhesive to rounded bottom edge 16. Then, when the device is used, this strip actually is the portion of the device which engages the ground.

Various embodiments have been added to the preferred embodiment of the invention and they are shown in the following FIGS. 3-6. For example, in FIG. 3, front fork 8 is shown where, on the outside of one of the blades of front fork 8, is adhesively attached VELCRO material strip 32 which mates with a second VELCRO material strip 30 attached to the side of one of the blades of bicycle fork protector 10. When bicycle fork protector 10 is not in use situated in the drop out slots of fork 8, it is held against fork 8 by the bringing together of velcro strips 30 and 32. To further reduce possibility of inadvertent loss of fork protector 10, or protection against thievery of the protector, a length of small diameter cable 36 attaches at its opposite ends fork protector 10 and to frame 8. Small diameter cable 36, which may be a coated steel cable, attaches to front fork 8 by means of cable retaining band 34. Cable 36 is held to fork protector 10 by passage through a small hole in fork protector 10 where the cable may be secured with an adhesive, or the cable may be knotted at its protruding end.

Figure 4:
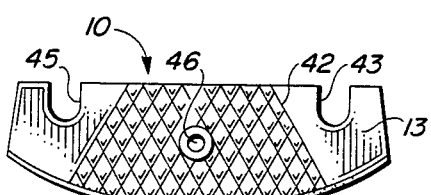
FIG. 4 is a front view of a another alternate embodiment of the subject invention.

FIG. 4 shows a still other embodiments of inventive fork protector 10 detailing the fork protector doubling as a safety light reflector wherein a portion of both side surfaces 13 have been coated with an appropriate light reflective material 42 or a plastic type reflector adhered to surface of flat side 13. It is noted that the portions of the protector engaged by the fork drop out slots are not covered with reflective material or plastic type reflector. Centrally to fork protector 10 is the means for securing fork protector 10 to one of the spokes in either bicycle wheel when the protector is being used as a safety reflector. Numeral 46 is directed to the spring loaded push button which, when depressed, pushes a hook out the other side of fork protector 10 to engage a spoke and then hold to the spoke.

FIG. 4 further shows spaced apart notches 43 and 45 serving as means to receive the drop out slots 6 wherein in addition to the fork protector being situated with the drop out slots, the material of fork protector 10 on both sides of notches 43 and 45 hold the blades proximate the bottom of notches 43 and 45 in order that the fork is protected against side to side compression (or expansion), or skew distortion.

Figure 5:
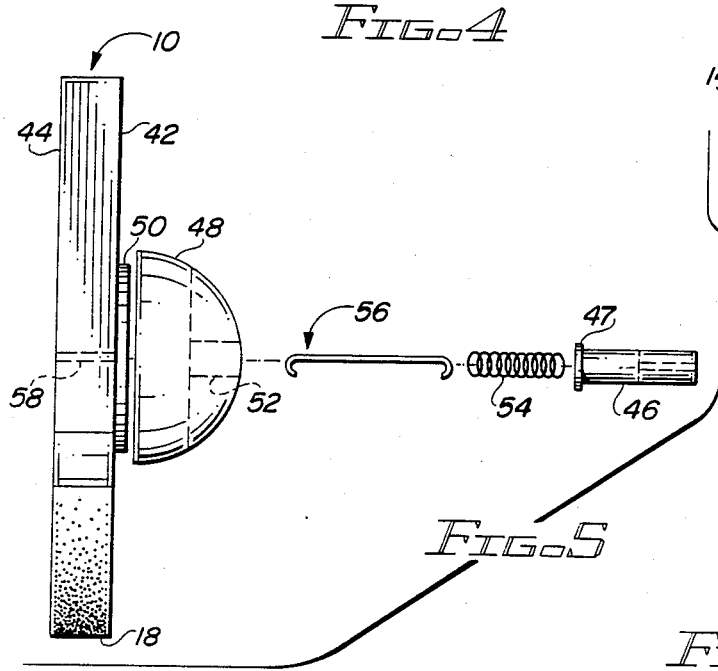
FIG. 5 is a side view of the alternate embodiment of the invention of FIG. 4 showing a portion in exploded view.

FIG. 5 is a side view of the alternate embodiment of the invention shown in FIG. 4 detailing firstly, the reflective material 42 and 44 on opposite surfaces of the flat plate comprising bicycle fork protector 10 and at the bottom, the dense shock absorbing material strip 18. On the right hand side of fork protector 10, generally centrally located, is housing 48 which is attached to fork protector 10 by encompassing in a securing manner lip 50 which is attached by an adhesive (or other appropriate manner) to the flat surface of fork protector 10. Housing 48 is substantially hollow except for its top portion which has a rounded opening 52 through which push button 46 protrudes. Spring 54 assures that push button 46 is situated at its furthest out position at all times except when being depressed. Hooking mechanism 56 is a short piece of rigid wire having hooks at both ends, the hook shown at the end closest to spring 54 residing interiorly to push button 46 and hooking around a short piece of wire place transversely in the barrel of push button 46. Proximate hooking mechanism 56 is a second hook, termed the spoke hook, adapted to engage the bicycle wheel spoke. The spoke hook, when not surrounding a spoke, engages the flat surface side of fork protector 10.

When the alternate embodiment shown in FIG. 5 is assembled, push button 46 resides interiorly to opening 52 of housing 48, its lip 47 preventing push button 46 from coming out of opening 52. Spring 54 is compressed between the area of lip 47 and lip 50 attached to fork protector 10. Hooking mechanism 56 passes through spring 54, push button 46, and through opening 58 in fork protector 10 with the hook at the end of hooking mechanism 56 residing immediately adjacent to the opening 58.

As is obvious, by depression of push button 46, the hook at the end of hooking mechanisms 56 protrudes substantially outward of the flat surface side of fork protector 10 to permit engagement of the bicycle wheel spoke.

Figure 6:
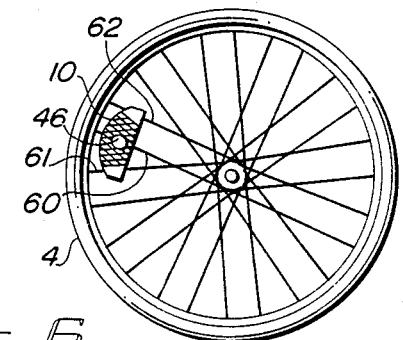
FIG. 6 is a side view of the alternate embodiment of the invention of FIGS. 4 and 5 shown in place installed on a bicycle front wheel.

Lastly, referring now to FIG. 6, a side view of a bicycle wheel with the alternate embodiment of fork protector 10 utilized as a safety reflector is shown. More specifically, spoke 60 is engaged by the spoke hook on the end of the hooking mechanism (not shown) which was pushed out from the surface of fork protector 10 by push button 46 to enable the engagement. To insure that fork protector 10, when used as a safety reflector, does not rotate to a position where it is transverse to the plane of wheel 4, it is suggested that the flat surfaces of fork protector 10 be wedged between adjacent spokes 61 and 62. With the fork protector spoke hook surrounding one spoke and wedged between that one spoke and the two adjacent spokes, it will stay in place during wheel rotation and not be flung out.

It is noted that with fork protector 10 wedged in place in drop out slots 6 of the front fork 8, and especially fitted into notches 43 and 45, in addition to protection given the tips of the fork against dropping, protection to the fork is afforded against being squeezed together or pulled apart, or sprung whereby the blades may become skewed one to another relative to the attachment of the blades at the crown of the fork.

While a preferred embodiment of the invention, together with alternate embodiments, has been shown in described, it will be appreciated that there is no intent to limit the invention by such disclosure. Accordingly, the disclosure is intended to cover all modifications and alternate embodiments falling within the spirit and the scope of the invention as defined in the appended claims.

I claim:

1. A bicycle fork protector adapted to be secured in a bicycle front fork drop out slots to contact the ground when the bicycle front wheel has been removed and placed proximate the rear wheel for securing with a chain and lock, the fork protector comprising;

an elongated flat plate having four peripheral sides, a first side of which is placed and held within the bicycle front fork drop out slots; and a second side contacting the ground, said second side opposite from and spaced away from said first side a distance greater than the length of the bicycle front fork drop out slots, said second side defining an arcuate shaped edge whereby the front fork does not contact the ground and the front fork will rock back and forth on said arcuate shaped edge if disturbed.

2. The bicycle fork protector as defined in claim 1 further including a dense compressible shock absorbing material strip, said strip operably attached to said edge of said arcuate shaped second side whereby said strip will contact the ground acting as a shock absorber for the bicycle front fork.

3. The bicycle fork protector as defined in claim 2 wherein said elongated flat plate has two spaced apart flat surfaces surrounded by said peripheral side edges, and a thickness between said surfaces, said thickness such that said elongated flat plate is frictionally held interiorly to the bicycle front fork drop and slots.

4. The bicycle fork protector as defined in claim 3 further including a pair of VELCRO materials, one of said VELCRO materials operably attached to said elongated flat plate, and the other of said VELCRO materials operably attached to the bicycle front fork whereby when said fork protector is not situated interiorly to the bicycle fork drop out slots, the VELCRO materials may be brought together to hold the bicycle fork protector proximate the bicycle front fork.

5. The bicycle fork protector as defined in claim 3 further including a length of flexible cable having two ends, one end of which operably attached to the bicycle front fork and the second end operably attached to the said fork protector whereby said fork protector will always be near the front fork and control against losing said bicycle fork protector is afforded.

6. The bicycle fork protector as defined in claim 3 further including light reflector material, said reflector material operably attached to each of said flat surfaces of said bicycle fork protector whereby said bicycle fork protector may also serve as a safety light reflector.

7. The bicycle fork protector as defined in claim 6 further including means attached to said bicycle fork protector to engage a bicycle wheel spoke whereby said bicycle fork protector may be attached to a spoke of one of the bicycle wheels to act as a safety light reflector.

8. The bicycle fork protector as defined in claim 7 wherein said means to engage the bicycle wheel spoke includes a spring loaded push button and hook operably attached to said spring loaded push button, said hook adapted to engage and surround the bicycle wheel spoke.

9. The bicycle fork protector as defined in claim 3 including means to engage the bicycle front fork blades proximate the drop out slots to prevent distortion of the blades one to another whereby the blades are protected against expansion, compression, or side to side skew distortion.

10. The bicycle fork protector as defined in claim 9 wherein said means to protect the front fork blades to prevent distortion defines two spaced apart notches formed in said bicycle fork protector first side, said notches adapted to engage the blade material proximate the drop out slots and thereby hold the blades against side to side expansion, compression, and side to side skew distortion.

* * * * *